(12) United States Patent
He et al.

(10) Patent No.: US 7,986,340 B2
(45) Date of Patent: *Jul. 26, 2011

(54) ARRANGEMENT FOR AND METHOD OF PROJECTING A COLOR IMAGE BY SWITCHING SCAN DIRECTIONS IN ALTERNATE FRAMES

(75) Inventors: Duanfeng He, South Setauket, NY (US); Dmitriy Yavid, Stony Brook, NY (US); Askold Strat, Sound Beach, NY (US)

(73) Assignee: Microvision, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,232

(22) Filed: Nov. 12, 2010

(65) Prior Publication Data

US 2011/0063527 A1 Mar. 17, 2011

Related U.S. Application Data

(63) Continuation of application No. 11/395,458, filed on Mar. 31, 2006, now Pat. No. 7,859,567.

(51) Int. Cl.
*H04N 3/02* (2006.01)

(52) U.S. Cl. ............ 348/195; 348/97; 348/206; 353/34; 359/202.1

(58) Field of Classification Search .................... 353/30, 353/31, 94, 98, 34, 46, 68, 88–89; 348/59, 348/96–100, 195, 102, 103, 206, 744–747; 359/201.1, 202.1, 204.2, 213.1; 358/474, 358/487, 489, 509, 518; 382/318, 319
See application file for complete search history.

(56) References Cited

U.S. PATENT DOCUMENTS

| | | |
|---|---|---|
| 6,483,556 B1 | 11/2002 | Karakawa et al. |
| 6,655,597 B1 | 12/2003 | Swartz et al. |
| 7,252,394 B1 | 8/2007 | Fu |
| 7,367,682 B2 | 5/2008 | Dvorkis et al. |
| 7,441,902 B2 * | 10/2008 | Dvorkis et al. ............... 353/30 |
| 7,527,384 B2 * | 5/2009 | Kim et al. .................... 353/94 |
| 7,665,853 B2 | 2/2010 | Yavid |
| 7,859,567 B2 * | 12/2010 | He et al. ..................... 348/195 |
| 2004/0136204 A1 | 7/2004 | Asao |
| 2006/0126023 A1 * | 6/2006 | Tan et al. ..................... 353/31 |
| 2007/0171375 A1 * | 7/2007 | Mizuuchi et al. ............. 353/30 |

* cited by examiner

*Primary Examiner* — Tuan Ho
*Assistant Examiner* — Kent Wang
(74) *Attorney, Agent, or Firm* — Kevin D. Wills

(57) ABSTRACT

A lightweight, compact image projection module, especially for mounting in a housing having a light-transmissive window, is operative for causing selected pixels in a raster pattern of scan lines to be illuminated to produce an image of high resolution in color. The direction of scanning of the scan lines is switched between alternate frames, and the resulting image is the superposition of successive frames integrated for viewing by the human eye.

17 Claims, 8 Drawing Sheets

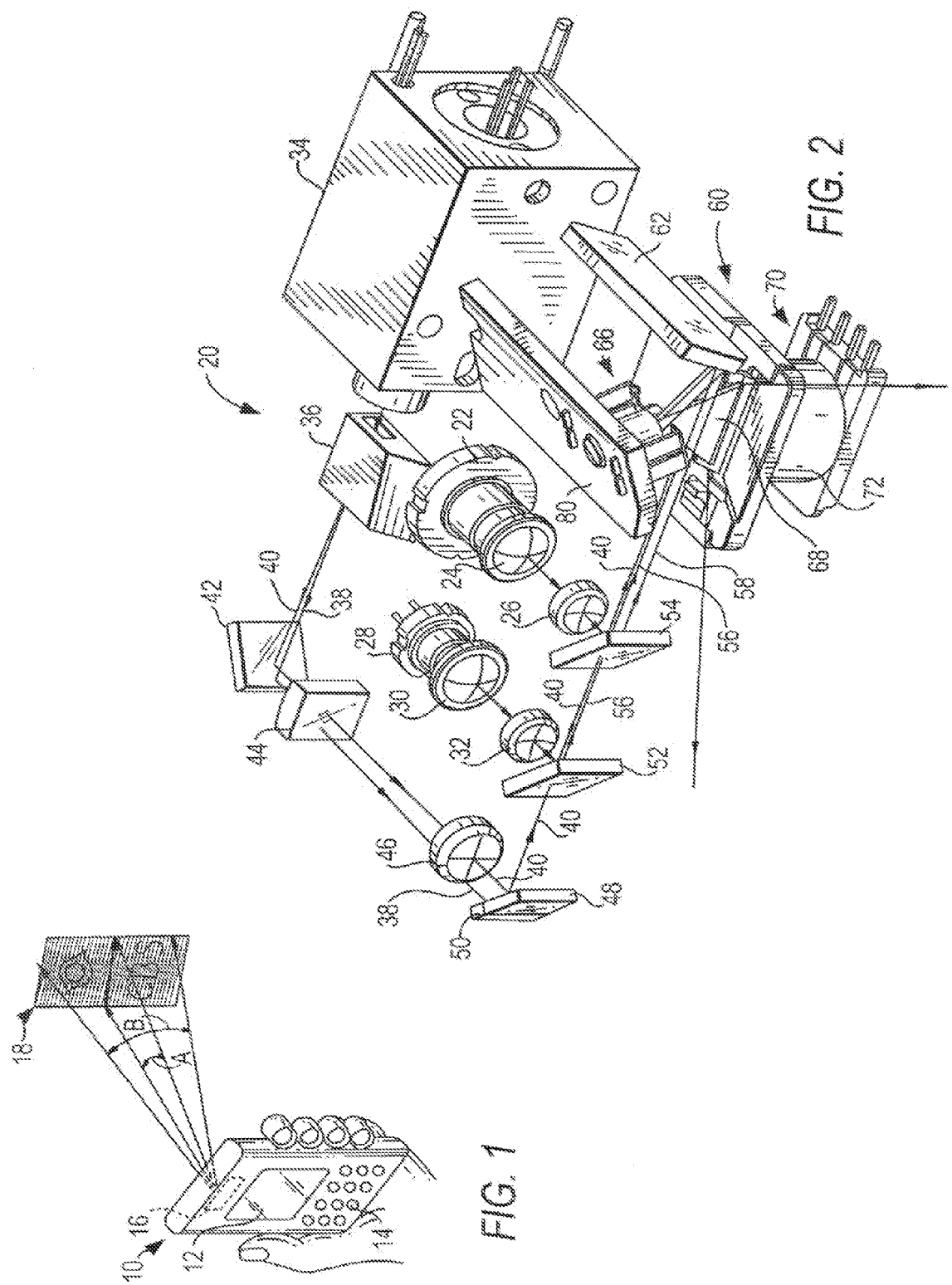

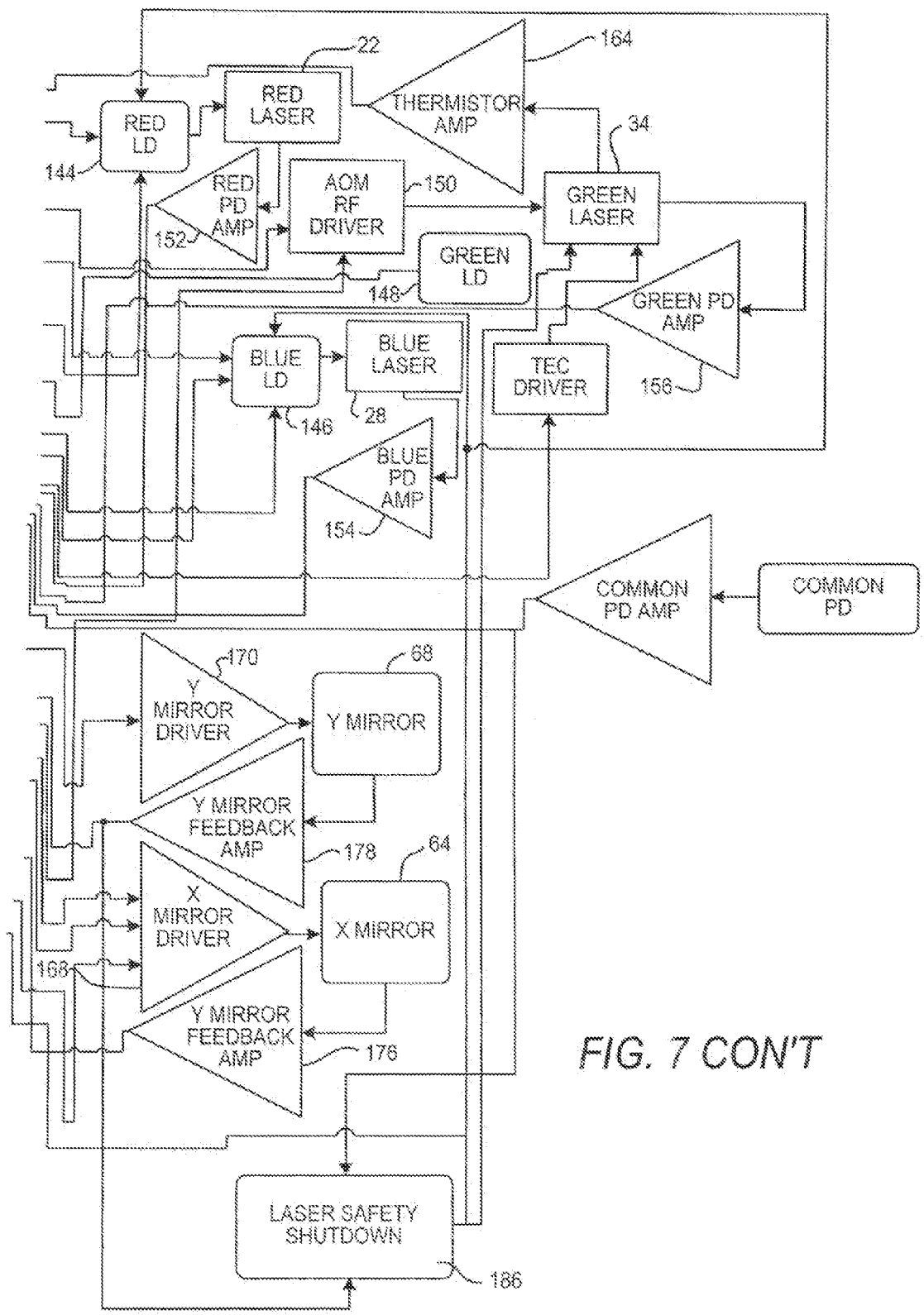
FIG. 7 CON'T

ARRANGEMENT FOR AND METHOD OF PROJECTING A COLOR IMAGE BY SWITCHING SCAN DIRECTIONS IN ALTERNATE FRAMES

CROSS REFERENCE TO RELATED APPLICATIONS

This application is a continuation of U.S. patent application Ser. No. 11/395,458, filed Mar. 31, 2006.

BACKGROUND OF THE INVENTION

1. Field of the Invention

The present invention generally relates to improving the display of a projected two-dimensional image, especially a color image.

2. Description of the Related Art

It is generally known to project a two-dimensional image on a screen based on a pair of scan mirrors which oscillate in mutually orthogonal directions to scan one or more laser beams over a raster pattern. One scan mirror is typically sinusoidally driven along a horizontal direction at a fast rate of speed, and the other scan mirror is typically linearly driven along a vertical direction at a slower rate of speed. The raster pattern thus created is a series of slanted scan lines resembling a sawtooth pattern. The odd numbered lines in the series generally slope downwardly from left to right across the display, and the even numbered lines in the series generally slope downwardly from right to left across the display. In the middle of the display, the scan lines are equally spaced, and the image is undistorted. However, at the right and left end regions of the display, the scan lines are bunched together in pairs of odd and even numbered lines, thereby making for a distorted image at the end regions of the display.

When only the odd numbered lines, or only the even numbered lines, are used to display a pattern (known as a single-line grating pattern), then the image is displayed reasonably well, although at the expense of resolution and brightness. However, when both the odd numbered lines and the even numbered lines are used to display a pattern (known as a double-line grating pattern), then the image is distorted at the end regions of the display. The problem is particularly noticeable when text is displayed, as well as in images projected in color from a plurality of lasers of different wavelengths. Mechanical misalignment among the laser beams from the lasers leads to color misalignment in the displayed image.

SUMMARY OF THE INVENTION

Objects of the Invention

Accordingly, it is a general object of this invention to provide an image projection arrangement that projects a sharp and clear, two-dimensional color image.

Another object of this invention is to minimize, if not eliminate, color misalignment in such projection arrangements.

Still another object of this invention is to increase the resolution of the color image projected by such arrangements.

An additional object is to provide a miniature, compact, lightweight, and portable color image projection arrangement useful in many instruments of different form factors.

Features of the Invention

In keeping with these objects and others, which will become apparent hereinafter, one feature of this invention resides, briefly stated, in an image projection arrangement for, and a method of, projecting an image, preferably a two-dimensional, color image. The arrangement includes a support; at least one laser, and preferably a plurality of red, blue and green lasers, for respectively emitting red, blue and green laser beams; a scanner for sweeping a pattern of scan lines in space at a working distance from the support, each scan line extending along a scan axis and having a number of pixels; and a controller for causing selected pixels to be illuminated, and rendered visible, by the laser beam(s) to produce the color image.

In accordance with this invention, the controller is operatively connected to the laser(s) and the scanner, for producing the image from a series of individual successive frames integrated for viewing by a human eye. The controller is operative, in at least one of the frames, for causing the scanner to sweep the scan lines in respective first scan directions along the scan axis and, in at least another of the frames, for causing the scanner to sweep the scan lines in respective second scan directions along the scan axis but opposite to the respective first scan directions swept in said at least one frame. Preferably, the at least one frame and the at least other frame alternate with each other. Advantageously, the controller generates at least 30 frames per second.

Hence, the direction of scan for the scan lines is switched for each alternating frame of the image. For example, in a first frame, the odd numbered scan lines may be swept from left to right, and the even numbered scan lines may be swept from right to left. Thereupon, in a second frame, the odd numbered scan lines may be swept from right to left, and the even numbered scan lines may be swept from left to right. The switching of the scan direction continues for alternate frames. The human eye integrates or averages out the images from the successive frames, and the result is that the image is more uniform and much less distorted than heretofore.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

DETAILED DESCRIPTION OF THE PREFERRED EMBODIMENTS

Figure 3:
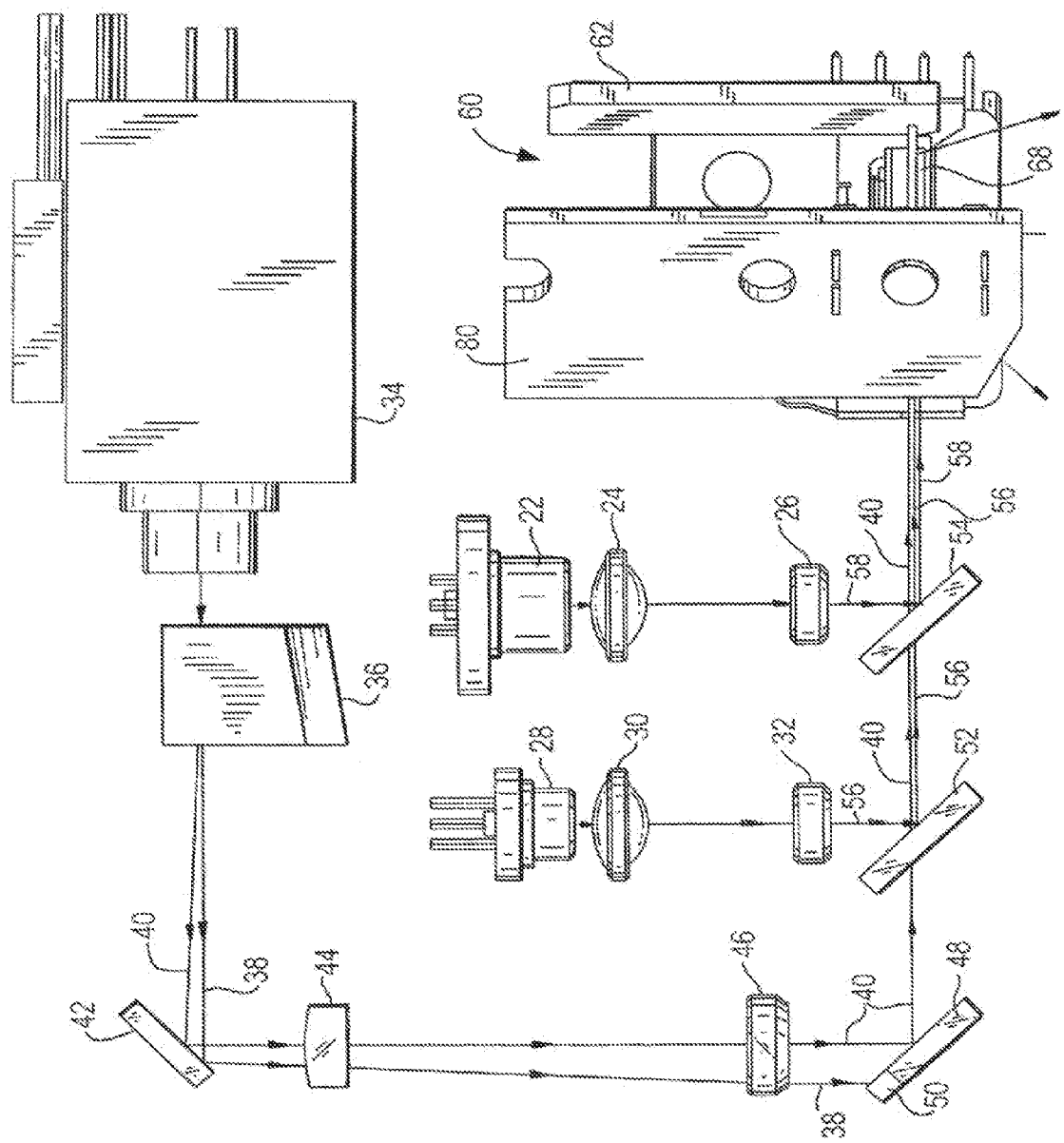
FIG. 3 is a top plan view of the arrangement of FIG. 2.

Reference numeral 10 in FIG. 1 generally identifies a handheld instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 shape the red beam profile over the working distance.

Another solid-state, semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam at 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to the controller, which adjusts the control current to the thermoelectric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator 36 which creates an acoustic standing wave inside a crystal for diffracting the green beam. The modulator 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, an electro-optic modulator can be used either externally or internally to the green laser module to pulse the green laser beam. Other possible ways to modulate the green laser beam include electro-absorption modulation, or Mach-Zender interferometer. The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as collinear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
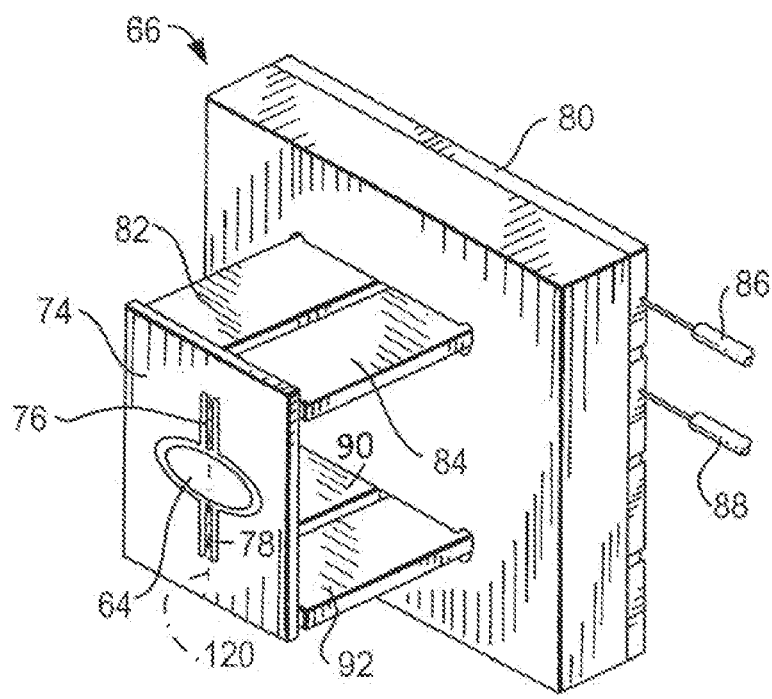
FIG. 4 is a perspective front view of an inertial drive for use in the arrangement of FIG. 2.
Figure 5:
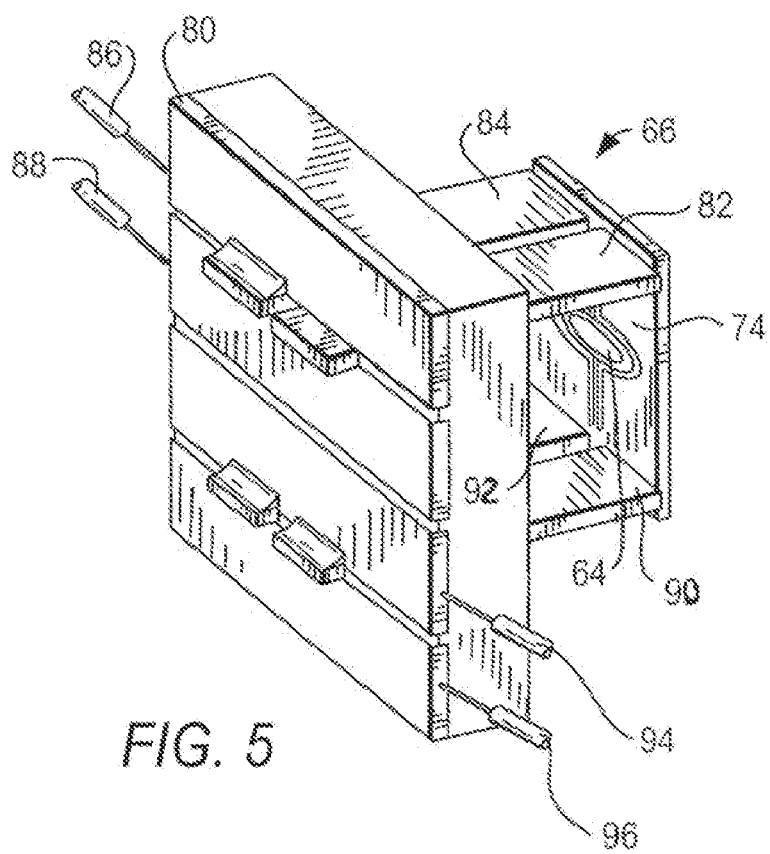
FIG. 5 is a perspective rear view of the inertial drive of FIG. 4.

The nearly collinear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measures 27μ, in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a generally horizontal scan line, and the slower mirror 68 sweeps the horizontal scan line vertically, thereby creating a raster pattern which is a grid or sequence of slanted scan lines from which the image is constructed, as explained in more detail below. Each scan line has a number of pixels. The image resolution is preferably XGA quality of 1024.times.768 pixels. Over a limited working range, a high-definition television standard, denoted 720 p, 1270.times.720 pixels can be displayed. In some applications, a one-half VGA quality of 320.times.480 pixels, or one-fourth VGA quality of 320.times.240 pixels, is sufficient. At minimum, a resolution of 160.times.160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the generally horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device, but preferably are kept energized when increased resolution and brightness are desired.

Figure 6:
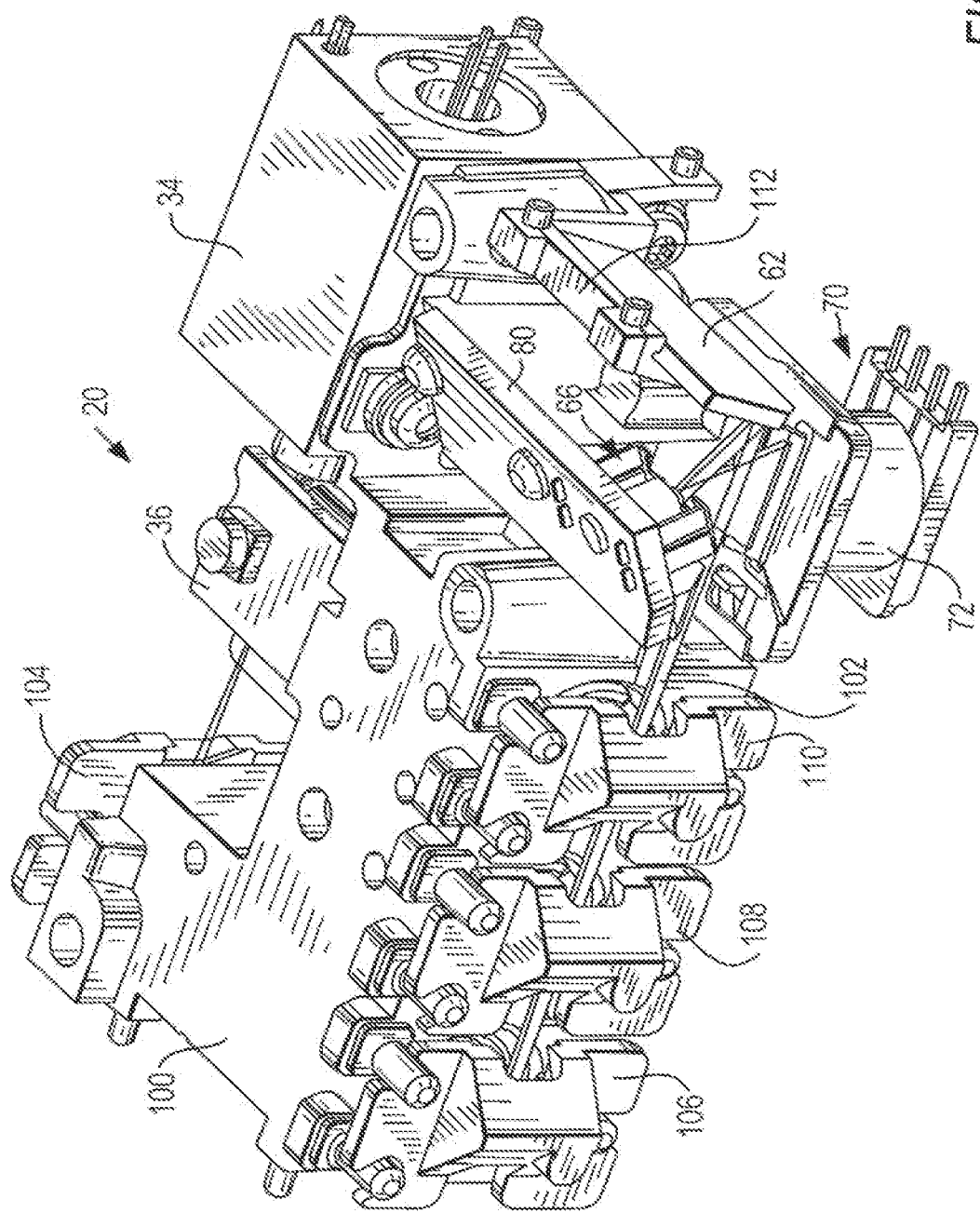
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human-or machine-readable information or graphic.

Figure 8:
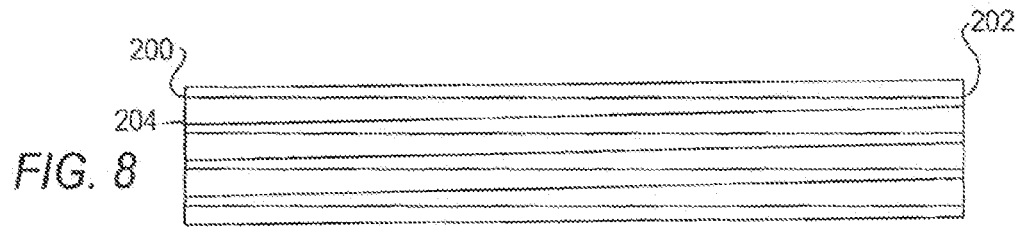
FIG. 8 is a diagrammatic, enlarged view of a raster pattern generated during operation of the arrangement of FIG. 2.

Referring to FIG. 8, the raster pattern of FIG. 1 is shown in an enlarged view. Starting at an end point 200, the laser beams are swept by the inertial drive along the horizontal direction at the horizontal scan rate to an opposite end point 202 to form a first odd numbered scan line. Thereupon, the laser beams are swept by the electromagnetic drive 70 along the vertical direction at the vertical scan rate to another end point 204 to form a second even numbered scan line. The extreme ends of the scan lines are not used for displaying information and, hence, are cut off in FIG. 8. The formation of successive scan lines proceeds in the same manner.

As described above, the odd numbered lines in the raster pattern generally slope downwardly from left to right across the display, and the even numbered lines in the raster pattern generally slope downwardly from right to left across the display. In the middle of the display, the scan lines are equally spaced, and the image is undistorted. However, at the right and left end regions of the display, the scan lines are bunched together in pairs of odd and even numbered lines, thereby making for a distorted image at the end regions of the display. The vertical scale in FIG. 8 is artificially enlarged for clarity purposes.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
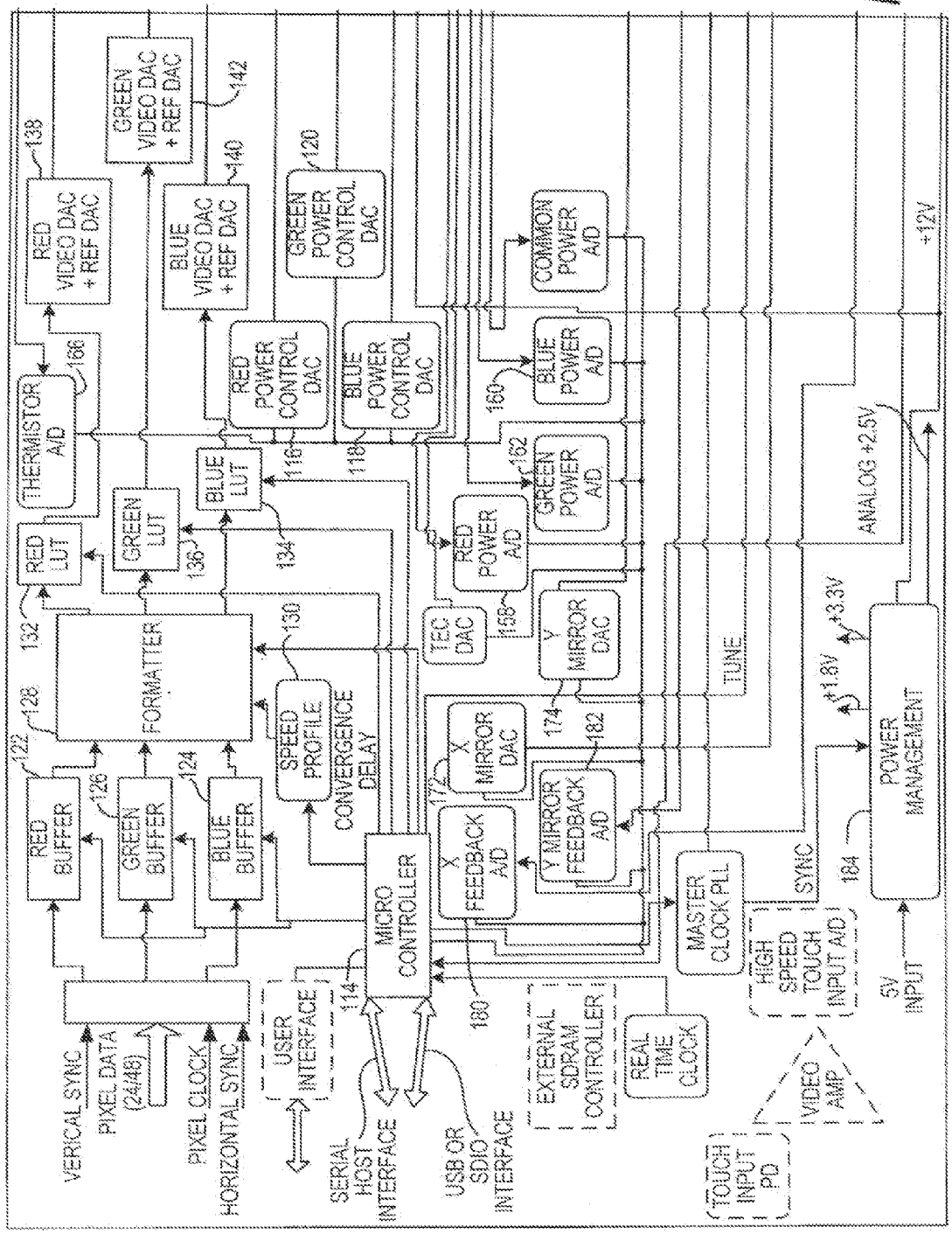
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 9:
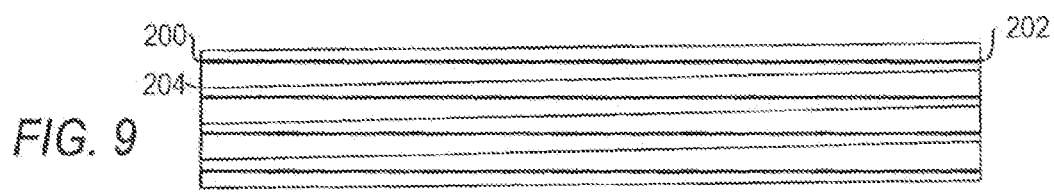
FIG. 9 is a view analogous to FIG. 8 of a single-line grating raster pattern.
Figure 10:
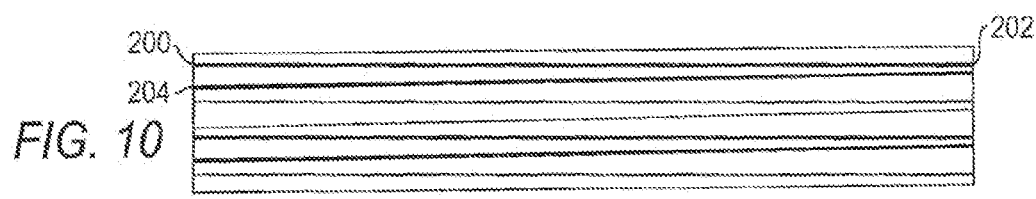
FIG. 10 is a view analogous to FIG. 8 of a double-line grating raster pattern.

As shown in FIG. 9, if only the odd numbered lines (or only the even numbered lines), are turned on to display an image (known as a single-line grating pattern), then the image is displayed, as schematically illustrated by the dark, thick scan lines, reasonably well. However, as shown in FIG. 10, when both the odd numbered lines and the even numbered lines are used in alternate pairs, to display an image (known as a double-line grating pattern), as schematically illustrated by the dark, thick scan lines, then the image is distorted at the end regions of the display.

Figure 10A:
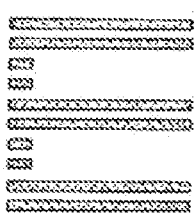
FIG. 10A is an ideal representation of the capital letter "E" in an exaggerated vertical scale.
Figure 10B:
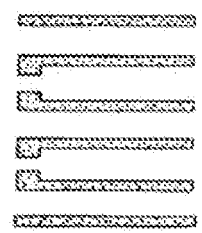
FIG. 10B is a distorted representation of the capital letter "E"

The problem is particularly noticeable when text is displayed. As shown in FIG. 10A, a capital letter "E" is ideally displayed in a block font of ten pixels high, excluding the spacing under the baseline of the text and between the lines of text. As before, the vertical scale of FIG. 10A has been exaggerated, in comparison to the beam spot size, for clarity. With sloped scan lines, the capital letter "E" may be displayed as shown in FIG. 10B, if this letter was to be displayed near the ends of the scan lines. Here, because of scan line bunching, the letter "E" becomes almost completely illegible.

Mechanical misalignment among the laser beams from the lasers leads to color misalignment in the displayed image. Perfect alignment of the three laser beams is difficult to achieve in mass production and assembly. To compensate for mechanical misalignment, a time delay is typically introduced in the generation of at least one of the laser beams to insure that all the laser beams arrive at the same pixel on the display.

Figure 11:
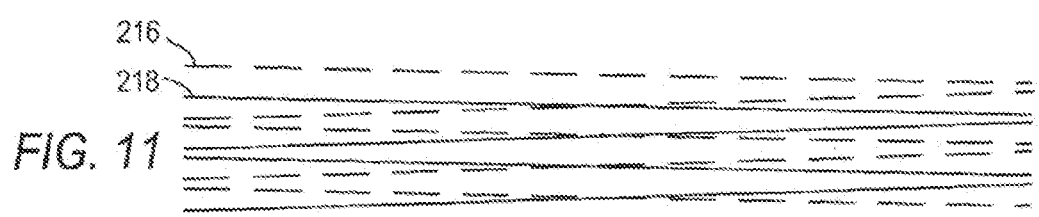
FIG. 11 is a view analogous to FIG. 8 depicting color misalignment in a raster pattern.

For images projected in color from a plurality of lasers of different wavelengths, a sawtooth scan pattern presents another problem. This is illustrated in FIG. 11. Mechanical misalignment among the laser beams from the lasers leads to color misalignment in the displayed image. For example, in FIG. 11, the scan line 216 of the blue laser is aimed too high, compared to the scan line 218 of the red laser, by about one scan line's vertical distance. This misalignment can be partially corrected by delaying the starting time of one or more of the lasers by a number of scan lines.

In the example illustrated in FIG. 11, the misalignment is compensated for by delaying the blue laser's modulation signal by one scan line's time. That is, the blue laser's first scan line 216 of display is turned on when the red laser is actually starting to scan its second scan line in the image. Because the scan line is being displayed in the reverse direction, both the red (information from the second scan line) and blue (information from the first scan line) signals must be inverted in their time sequence. However, because of the slanted sawtooth scan pattern, the different colors of the same scan line will have different slants, thereby causing a perceived color misalignment that is opposite on the two ends of the scan lines.

In accordance with this invention, the controller is operatively connected to the laser(s) and the scanner, for producing the image from a series of individual successive frames integrated for viewing by a human eye. The controller is operative, in at least one of the frames, for causing the scanner to sweep the scan lines in respective first scan directions along the scan axis and, in at least another of the frames, for causing the scanner to sweep the scan lines in respective second scan directions along the scan axis but opposite to the respective first scan directions swept in said at least one frame. Preferably, the at least one frame and the at least other frame alternate with each other. Advantageously, the controller generates at least 30 frames per second.

Figure 14:
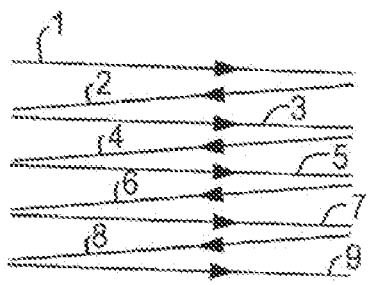
FIG. 14 is a schematic view depicting respective scan directions for the scan lines in a first frame in accordance with this invention.
Figure 15:
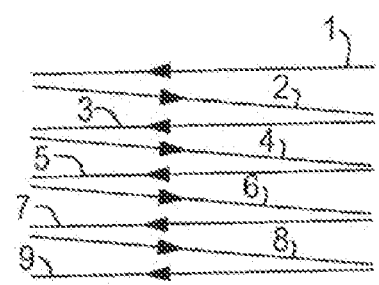
FIG. 15 is a schematic view depicting respective scan directions for the scan lines in a second frame in accordance with this invention.

Hence, the direction of scan for the scan lines is switched for each alternating frame of the image. For example, in a first frame, as shown in FIG. 14, representative odd numbered scan lines 1, 3, 5, 7 and 9 are swept from left to right, and representative even numbered scan lines 2, 4, 6 and 8 are swept from right to left. Thereupon, in a second frame, as shown in FIG. 15, the representative odd numbered scan lines 1, 3, 5, 7 and 9 are swept from right to left, and the representative even numbered scan lines 2, 4, 6 and 8 are swept from left to right. The switching of the scan direction continues for alternate frames. The human eye integrates or averages out the images from the successive frames, and the result is that the image is more uniform and much less distorted than heretofore.

Figure 12:
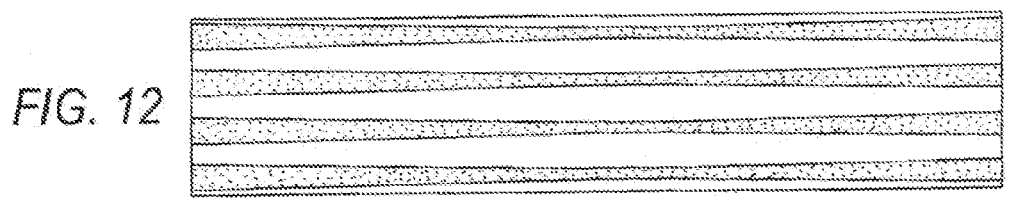
FIG. 12 is a view analogous to FIG. 9 of a single-line grating raster pattern improved by alternate frame switching in accordance with this invention.

The results for such scan line direction switching is shown in FIG. 12 for a single-line grating. In comparison with the single-line grating of FIG. 9, FIG. 12 illustrates that the superposition of a left-to-right scan line and a right-to-left scan line produces a composite scan line whose width is fairly uniform across the display, and all the composite scan lines are generally parallel to one another. Thus, for a single-line grating, the display is similar to the previous performance of FIG. 9.

Figure 13:
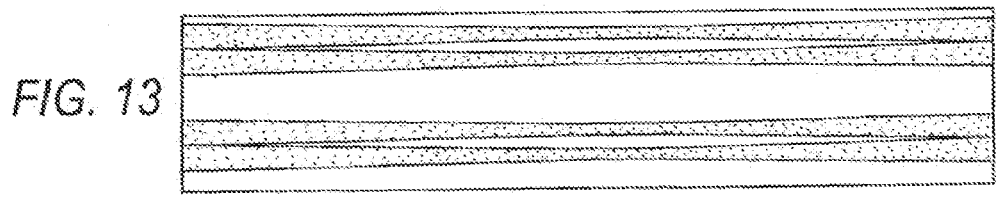
FIG. 13 is a view analogous to FIG. 10 of a double-line grating raster pattern improved by alternate frame switching in accordance with this invention.

In contrast, the double-line grating of FIG. 13 is a significant improvement over that shown in FIG. 10. FIG. 13 illustrates that the superposition of a left-to-right scan line and a right-to-left scan line produces a composite scan line whose width is fairly uniform across the display, and all the composite scan lines are generally parallel to one another. The end regions are not so bunched together as in FIG. 10.

The problem of color misalignment as shown in FIG. 11 is now completely gone, because the scan lines for the different colors, when integrated over two successive frames, exactly overlap.

Figure 16:
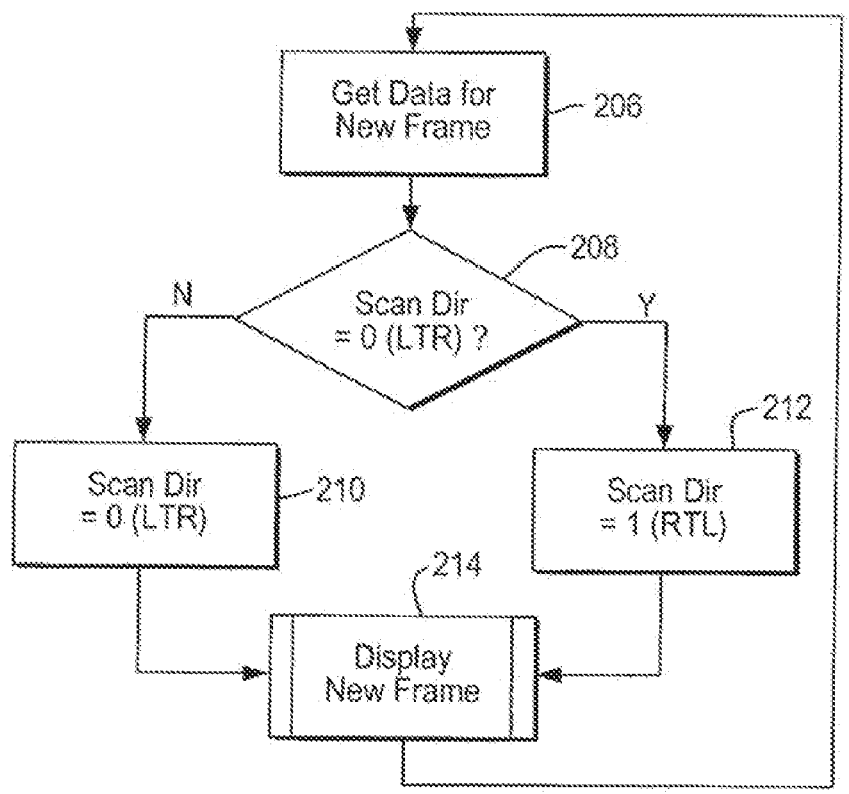
FIG. 16 is a flow chart depicting alternate frame switching in accordance with this invention.

FIG. 16 is a flow chart in which data is retrieved for a first frame in block 206, and then the scan direction of the scan lines is determined to see whether it is left-to-right (LTR) in block 208. If the scan direction is LTR, then the scan proceeds in block 210, and a new second frame is displayed in block 214. If the scan direction is not LTR, then it is right-to-left (RTL), and the scan proceeds in block 212, and a new second frame is displayed in block 214.

It will be understood that each of the elements described above, or two or more together, also may find a useful application in other types of constructions differing from the types described above.

While the invention has been illustrated and described as embodied in an improved display for a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An image projection arrangement comprising:

at least one laser light source to provide a laser beam;

a scanning assembly having at least one mirror to reflect and sweep the laser beam back and forth horizontally left-to-right and right-to-left while also sweeping vertically; and a controller to influence operation of the scanning assembly to sweep a first scan line in a first frame from left-to-right, and to sweep the first scan line in a second frame from right-to-left.

2. The image projection arrangement of claim 1 wherein the at least one mirror sweeps the beam back and forth horizontally at a mechanical resonant frequency.

3. The image projection arrangement of claim 1 wherein the scanning assembly includes a first mirror to sweep horizontally and a second mirror to sweep vertically.

4. The image projection arrangement of claim 3 wherein the first mirror sweeps at a resonant frequency and the second mirror sweeps at a nonresonant frequency.

5. The image projection arrangement of claim 1 wherein the scanning assembly includes a single two-axis mirror.

6. The image projection arrangement of claim 1 wherein the at least one laser light source comprises a plurality of laser light sources to provide laser beams with differing wavelengths.

7. The image projection arrangement of claim 1 wherein the controller is operative to alternate the first scan line from left-to-right and right-to-left in successive frames.

8. A hand-held instrument comprising:

a laser light source to provide a laser beam;

a scanning assembly having a first scan mirror and a second scan mirror, the first scan mirror operative to reflect and sweep the laser beam onto the second scan mirror, the second scan mirror operative to reflect and sweep the laser beam to form a raster pattern; and a controller to effect movement of the first and second scan mirrors in a manner that causes a first scan line in the raster pattern to alternate between left-to-right and right-to-left in successive image frames.

9. The hand-held instrument of claim 8 wherein the first mirror sweeps at a mechanically resonant frequency.

10. The hand-held instrument of claim 9 wherein the second mirror sweeps at a nonresonant frequency.

11. The hand-held instrument of claim 8 the laser light source comprises a plurality of lasers to provide different color laser beams.

12. A method comprising:

sweeping a modulated laser beam through a horizontal scan angle; and sweeping the modulated laser beam through a vertical scan angle to render successive frames of an image;

wherein sweeping the modulated laser beam through the horizontal scan angle comprises alternately sweeping a first scan line from left-to-right and right-to-left in successive frames.

13. The method of claim 12 wherein sweeping the modulated laser beam through a horizontal angle and a vertical angle comprises sweeping the modulated laser beam through the horizontal angle with a first mirror and sweeping the modulated laser beam through the vertical angle with a second mirror.

14. The method of claim 13 wherein sweeping the modulated laser beam through the horizontal angle comprises sweeping the first mirror at a mechanically resonant frequency.

15. The method of claim 14 wherein sweeping the modulated laser beam through the vertical angle comprises sweeping the second mirror at a nonresonant frequency.

16. The method of claim 12 wherein sweeping the modulated laser beam through a horizontal angle and a vertical angle comprises sweeping the modulated laser beam with a single two-axis mirror.

17. The method of claim 12 further comprising turning on and off a plurality of lasers that emit light at differing wavelengths to form the modulated laser beam.

* * * * *